United States Patent [19]
Loeb et al.

[11] 3,940,530
[45] Feb. 24, 1976

[54] SUPPORT MEDIA WITH SUPPORTED OBJECT

[75] Inventors: William E. Loeb, Martinsville; Mark A. Spivack, Wachtung, both of N.J.

[73] Assignee: Union Carbide Corporation, New York, N.Y.

[22] Filed: Nov. 25, 1974

[21] Appl. No.: 527,159

Related U.S. Application Data

[62] Division of Ser. No. 256,531, May 24, 1972, Pat. No. 3,864,202, which is a division of Ser. No. 167,252, July 29, 1971, abandoned.

[52] U.S. Cl. .................. 428/206; 73/86; 73/167; 73/432 SD; 248/346; 428/15; 428/220; 428/323; 428/325; 428/327; 428/338; 428/339; 428/402; 428/500
[51] Int. Cl.² .... B32B 3/16; B32B 5/16; G01N 3/56
[58] Field of Search ............ 428/15, 206, 220, 323, 428/325, 327, 337, 338, 339, 402, 913, 500; 73/86, 167, 432 SD; 156/62.2; 248/346

[56] References Cited
UNITED STATES PATENTS

| | | | |
|---|---|---|---|
| 3,301,707 | 1/1967 | Loeb et al. | 428/220 |
| 3,429,739 | 2/1969 | Tittman et al. | 428/264 |
| 3,600,216 | 8/1971 | Stewart | 428/417 |
| 3,762,454 | 10/1973 | Wilkins, Jr. | 428/913 |
| 3,764,455 | 10/1973 | Lovell et al. | 428/325 |
| 3,817,096 | 6/1974 | Osofsky | 73/167 |

*Primary Examiner*—George F. Lesmes
*Assistant Examiner*—Charles E. Lipsey
*Attorney, Agent, or Firm*—William Raymond Moran

[57] ABSTRACT

Pellicles of para-xylylene polymers are used as the sole support media for masses of objects supported thereon. The supported objects can be combined with the pellicle either during the formation of the pellicle or after the pellicle has been manufactured. The composite article is used wherever it is desirable to provide a support media which has as little detrimental influence as possible on the intended function of the supported object.

1 Claim, 4 Drawing Figures

SUPPORT MEDIA WITH SUPPORTED OBJECT

This is a division of application Ser. No. 256,531 filed May 24, 1972, now U.S. Pat. No. 3,864,202, which in turn is a division of application Ser. No. 167,252 filed July 29, 1971, now abandoned.

BACKGROUND OF THE INVENTION

1. Field of the Invention

The invention relates to composite articles comprising a support medium supporting a mass thereon.

2. Description of the Prior Art

Para-xylylene polymers have been used for various protective coating and encapsulation purposes as disclosed for example in U.S. Pat. Nos. 3,246,627; 3,268,773; 3,288,728; 3,300,332; 3,301,707; 3,319,141; 3,327,184; 3,332,891; 3,333,169; 3,342,754 and 3,375,110.

SUMMARY OF THE INVENTION

It has now been found that para-xylylene polymers can be used as innocuous support media for the purposes of supporting thereon an active or passive device or material if extremely thin films or pellicles of the para-xylylene polymer are used as the support media. An object of the present invention is to provide innocuous support media for active or passive articles which are to be supported on said media.

DESCRIPTION OF THE PREFERRED EMBODIMENT

Figure 1:
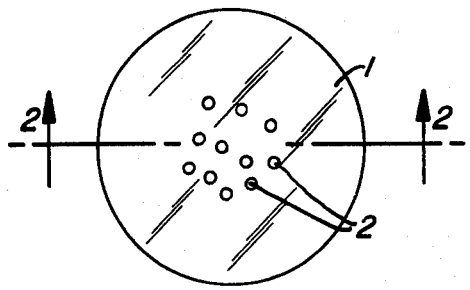
FIGS. 1 to 3 show a simulated dust field supported on a pellicle.

In accordance with the preferred teachings of the present invention pellicles of p-xylylene polymers are used as innocuous support media to wholly support thereon active or passive masses. These masses may be incorporated into the pellicle either during the formation of the pellicle or after the pellicle has been manufactured.

The expression "wholly supporting" means that the poly-para-xylylene pellicle is the sole support for the objects supported thereon, and, in the plane of the film, the object is completely surrounded by such film. Because of the resulting geometric isolation of the pellicle supported objects, relative to any other objects not so supported by the pellicle, the supported objects are rendered ohmically isolated from such non-supported objects.

The Pellicles

The pellicles which are used as the innocuous support media for the purposes of the present invention are essentially flat films of para-xylylene polymers which have a thickness of up to about 25,000, and preferably in the range of about 250 to 5,000, angstrom units. These films have a mass of up to about 400, and preferably in the range of about 2.5 to 75, micrograms per square centimeter. These pellicles, for the purposes of the present invention, have a total surface area, on each face thereof, of about $\geq$ 25 square millimeters, and preferably of about 100 to 500 square centimeters.

The mass of a pellicle will vary depending on the thickness of the films and the density of the polymer which is used to form the film. The paraxylylene polymers which are used to form the films have densities of the order of about 1.0 to 1.5.

The term "essentially flat" means that the free film, when observed under monochromatic light in the visible region will exhibit $\leq$ 4 interference fringes in any given square centimeter of surface area on the surface of the pellicle.

The films or pellicles of the para-xylylene polymers are prepared, as disclosed in the above mentioned patents, by condensing vapors of p-xylylene monomer which can be produced by the pyrolytic cleavage of one or more cyclic dimers represented by the following structure

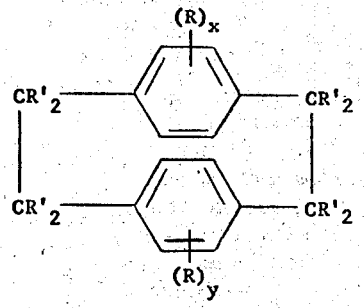

wherein R is an aromatic nuclear substituent, $x$ and $y$ are each integers from 0 to 3, inclusive, and R' is H, Cl and/or F. The thus formed vaporous monomers may be in the form of diradicals having the structures

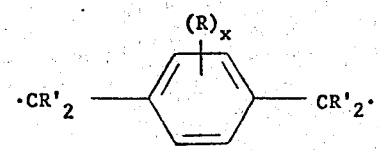

and

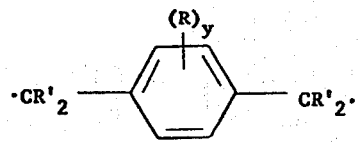

and/or moieties having the tetraene or quinoid structures:

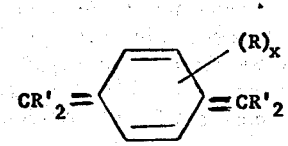

and

It is believed that the tetraene or quinoid structure is the dominant structure which results when the dimer is pyrolyzed, but that the monomer polymerizes as though it were in the diradical form.

Thus, where $x$ and $y$ are the same, and the aromatic nuclear substituent on each monomer is the same, and all the R's are the same, two moles of the same p-xylylene monomer are formed, and when condensed, yield a substituted or unsubstituted p-xylylene homopolymer. When $x$ and $y$ are different or the aromatic nuclear substituents on each monomer are different, or the R's are different, condensation of such monomers will yield copolymers as hereinafter set forth. Examples of the R substituent groups which may be present in the dimers and monomers are organic groups such as alkyl, aryl, alkenyl, cyano, alkoxy, hydroxy alkyl, carbalkoxy and like radicals and inorganic radicals such as hydroxyl, halogen and amino groups. COOH, $NO_2$ and $SO_3H$ groups may be added as R groups to the polymer after it is formed. The unsubstituted positions on the aromatic rings are occupied by hydrogen atoms.

The particularly preferred substituent R groups are the $C_1$ to $C_{10}$ hydrocarbon groups, such as the lower alkyls, i.e., methyl, ethyl, propyl, butyl and hexyl, and aryl hydrocarbons such as phenyl, alkylated phenyl, naphthyl and like groups; and the halogen groups, chlorine, bromine, iodine and fluorine. Hereinafter the term "a di-p-xylylene" refers to any substituted or unsubstituted cyclic di-p-xylylene as hereinabove discussed.

Condensation of the monomers to form the p-xylylene polymers can be accomplished at any temperature below the decomposition temperature of the polymer, i.e., at <250°C. The condensation of the monomers will proceed at a faster rate, the colder is the substrate on which the condensation is to take place. Above certain temperatures, which might be defined as a ceiling condensation temperature, the monomers will only condense at rates which are relatively slow for commercial applications. Each monomer has a different ceiling condensation temperature. For example, at 0.5 mm Hg pressure the following condensation and polymerizations ceilings are observed for the following monomers:

|  | Degrees centigrade |
|---|---|
| p-Xylylene | 25–30 |
| Chloro-p-xylylene | 70–80 |
| Cyano-p-xylylene | 120–130 |
| n-Butyl-p-xylylene | 130–140 |
| Iodo-p-xylylene | 180–200 |

Thus, homopolymers may be made by maintaining the substrate surface at a temperature below the ceiling condensation temperature of the particular monomer species involved, or desired in the homopolymer. This is most appropriately termed "homopolymerizing conditions."

Where several different monomers existing in the pyrolyzed mixture have different vapor pressure and condensation characteristics as for example p-xylylene, or cyano-p-xylylene and chloro-p-xylylene, or any other mixture thereof with other substituted monomers, homopolymerization will result when the condensation and polymerization temperature is selected to be at or below that temperature at which only one of the monomers condenses and polymerizes. Thus, for the purpose of this invention the term "under homopolymerization conditions" is intended to include those conditions where only homopolymers are formed.

Therefore it is possible to make homopolymers from a mixture containing one or more of the substituted monomers when any other monomers present have different condensation or vapor pressure characteristics, and wherein only one monomer species is condensed and polymerized on the substrate surface. Of course, other monomer species not condensed on the substrate surface can be drawn through the apparatus as hereinafter described in vaporous form to be condensed and polymerized in a subsequent cold trap.

Inasmuch as the p-xylylene monomers, for example, are condensed at temperatures of about 25° to 30°C., which is much lower than that at which the cyano p-xylylene monomers condense, i.e., about 120° to 130°C., it is possible to have such p-xylylene monomers present in the vaporous pyrolyzed mixture along with the cyano-substituted monomers when a homopolymer of the substituted dimer is desired. In such a case, homo-polymerizing conditions for the cyano p-xylylene monomers are secured by maintaining the substrate surface at a temperature below the ceiling condensation temperature of the substituted p-xylylene but above that of the unsubstituted p-xylylene, thus permitting the unsubstituted p-xylylene vapors to pass through the apparatus without condensing and polymerizing, but collecting the poly-p-xylylene in a subsequent cold trap.

It is also possible to obtain substituted copolymers through the pyrolysis process hereinabove described. Copolymers of p-xylylene and substituted p-xylylene monomers, as well as copolymers of substituted p-xylylene monomers wherein the substituted groups are all the same radicals but wherein each monomer contains a different number of substituent groups, can all be obtained through such pyrolysis process.

Copolymerization also occurs simultaneously with condensation, upon cooling of the vaporous mixture of reactive monomers to a temperature below about 200°C. under polymerization conditions.

Copolymers can be made by maintaining the substrate surface at a temperature below the ceiling condensation temperature of the lowest boiling monomer desired in the copolymer, such as at room temperature or below. This is considered "copolymerizing conditions," since at least two of the monomers will condense and copolymerize in a random copolymer at such temperature.

In the pyrolytic process, the reactive monomers are prepared by pyrolyzing a substituted and/or unsubstituted di-para-xylylene at a temperature less than about 750°C., and preferably at a temperature between about 600°C. to about 680°C. At such temperatures, essentially quantitative yields of the reactive monomers are secured. Pyrolysis of the starting di-p-xylylene begins at about 450°C. regardless of the pressure employed. Operation in the range of 450°–550°C. serves only to increase the time of reaction and lessen the yield of polymer secured. At temperatures above about 750°C., cleavage of the substitutent group can occur, resulting in a tri-/or polyfunctional species causing cross-linking or highly branched polymers.

The pyrolysis temperature is essentially independent of the operating pressure. It is preferred, however, that reduced or subatmospheric pressures be employed. For most operations, pressures within the range of 0.0001 to 10 mm. Hg absolute are most practical. However, if desired, greater pressures can be employed. Likewise, if desirable, inert vaporous diluents such as nitrogen, argon, carbon dioxide, steam and the like can be employed to vary the optimum temperature of operation or to change the total effective pressure in the system.

When the vapors condense on the substrate to form the polymer, the polymer forms as a continuous film of uniform thickness. The films are transparent and pinhole free. The surface area and thickness of the film can be varied by various procedures, as by varying the size of the substrate, by varying the amount of dimer used, and by varying the reaction temperature, time and pressure.

The Supported Masses

The masses which are to be supported on the para-xylylene films may be active or passive devices or objects. The thus supported devices or objects are used where it is desirable that the action of the support medium has as insignificant an influence as possible on the intended function of the supported active or passive device or object. The para-xylylene polymer pellicles, therefore, are used as relatively massless, non-existent positioning media, such that any detrimental effect of various types of influences such as thermal influences, mass and gravitational influences, radiated energy types of influences and magnetic or electrostatic field influences due to the pellicle is insignificant while the supported article or object performs its intended function relative to such influences.

Examples of passive objects or devices which may be supported on pellicles are droplets of encapsulated fluid such as water, or particles of sand or glass which may be deposited or used on the para-xylylene polymer films in order to simulate dust fields, ice fields, and rain fields. These simulated dust fields, ice fields and rain fields are used as a means for measuring the amount of erosion which a natural dust field, ice field or rain field might cause when a ballistic vehicle is fired or passed through such fields. Thus, the simulated dust fields, ice fields or rain fields can be prepared by placing particles of sand or glass or encapsulated fluids on the pellicles and mounting the thus simulated field in the path of a simulated ballistic missile and photographing or otherwise monitoring the impact of the missile on the simulated field, and by measuring the amount of erosion on the ballistic missile which the simulated field causes. When the simulated dust or ice fields are prepared, they are usually prepared in such a way as to have the supported particles of simulated dust or ice cover up to about 10% of the supporting surface of the pellicle. When the simulated rain fields are prepared, they are usually prepared in such a way as to have the supported droplets of encapsulated liquid which is used to simulate the rain cover up to about 80% of the supporting surface of the pellicle. The particles of liquid can be encapsulated in poly-p-xylene or other known agents for encapsulating droplets of liquids. The droplets or particles which are used for the purposes of simulating the dust, ice or rain usually have a diameter of up to about 5 mm, and preferably of about 0.05 to 2 mm. The supported particles may be mounted on the pellicles in an ordered or random pattern. The pellicles on which these simulated dust, ice or rain fields are mounted usually have a surface area, on each face thereof, of about 300–400 square centimeters.

Examples of the active types of devices or objects which may be mounted on the para-xylylene polymer pellicles of the present invention are devices or objects which are adapted to absorb, transmit, and/or reflect radiated energy in a perceptible manner. Examples of electromagnetic radiation which may be encountered in this regard include gamma rays, X-rays, infrared rays, ultraviolet light rays, radio rays, visible light rays and electrons. These types of radiation usually have a wave length of at least $10^{-14}$ meters, and preferably a wave length of about $10^{-12}$ to $10^{+2}$ meters. In the case of ionizing radiation, the preferred range of energy values is $\geq$ 0.01 Kev (kilo electron volt). These types of devices or objects include those which are more opaque to the electromagnetic radiation than is the para-xylylene polymer film and which may be used in mounted form as masks for the radiation beams, such as electron beam masks. These masks provide a pattern for the radiated energy wherein the radiated energy can be transmitted in some areas and be absorbed or reflected in other areas.

Another type of the active devices or objects which may be mounted on the pellicles are those which are adapted to absorb and perceptibly respond to mechanical energy, such as sound waves or thermal energy, such as bimetallic strips for sensing temperature changes. A further type of the active device or object which may be mounted on the pellicle are those which are adapted to sense and perceptibly respond to a magnetic field, and these would include all magnetisable materials.

A further type of active device or object which may be mounted on the pellicles are those which are adapted to sense and perceptibly respond to an electrostatic field such as a capacitive device.

When these active type of devices or objects are mounted on the surface of the pellicles they are mounted in such a way as to cover up to about 90%, and preferably about 0.5 to 75%, of the surface of the pellicle on which they are mounted. They are usually mounted or positioned on the pellicles in an ordered manner. The pellicles on which these active types of devices or objects are mounted have surface areas in the range of 3 to 100 square centimers.

It may be seen, therefore, that the interaction of the supporting pellicle is insignificant when compared to the action of the suspended device or object which is supported on the pellicle. Also, because of the nature of the poly-para-xylylene materials they are not perceptibly influenced by the other forces which may be directed against the supported device or object such as thermal influences, magnetic influences, electrostatic influences, and electromagnetic radiation influences. Thus, the pellicle acts almost as an invisible or non-existant support medium for the purposes of subjecting the supported object or device to a specific influence without having the support media either contribute to such influence or be affected by such influence.

The devices or objects may be mounted or supported on the pellicle by either embedding them in one or both of the faces of the pellicle or by mounting them on one or both of the faces of the pellices. Normally the devices or objects are only mounted on one of the two faces of the pellicle. The devices or objects can be mounted on a preformed pellicle, or the pellicle can be formed on top of the desired arrangement of the devices or objects.

It may be desirable in some instances, but it is not always necessary, to use an adhesive material for the purposes of assuring a proper mounting of the device or object on the pellicle. The adhesives which may be used in this regard include the silicone greases or silicone rubbers which are made from polydimethyl siloxane materials; vegetable oil greases; cyano-acrylate polymers; and a 50% solution of polystyrene in xylene. Embedding of the device or object in the poly-para-xylylene is desirable when the particle size of the device or object to be supported is of the order of about 50 to 200 $\mu$m in diameter.

The following examples are illustrative of the present invention but are not intended as a limitation upon the scope thereof.

EXAMPLE I

This example relates to the preparation of a simulated ice or dust field. The particles which were to be used to simulate the dust or ice field were glass beads which were 100 to 1,000 $\mu$m in diameter. A 5 inch × 5 inch glass plate was treated with a release agent by wiping the agent on so as to provide a thin film of the agent thereon. The release agent was an aqueous soap solution. Before the release agent dried, the glass beads were sprinkled onto the treated glass plate in a random pattern which covered an area of about 1 to 5 square centimeters. The release agent was allowed to air dry and the glass plate was then placed in a poly-para-xylylene coating chamber. The plate was laid flat in the chamber with the side having the glass beads thereon facing upward. A film of poly-monochlorinated-para-xylylene of 1,000A thickness was then deposited over the glass beads on the glass plate. Following the removal of the thus coated glass beads and glass plate from the coating chamber, a 5 inch diameter aluminum ring was attached to the polymer coated glass plate with an RTV silicone adhesive. When the adhesive cured, in about 1 hour, the glass plate exterior to the ring was scored with a razor blade. The glass plate and ring were then partially submerged in tepid, about 35° to 40°C., water which dissolved the release agent from between the para-xylylene polymer and the glass plate thus allowing the poly-para-xylylene to be removed from the glass plate and water while suspended on the aluminum ring. The glass beads, which were also polymer coated, were now incorporated into the pellicle in the same random pattern configuration in which they were applied to the glass plate. The glass beads covered about 2% of the face of the pellicle to which they were attached.

A second simulated dust field was prepared as described above using particles of sand instead of the glass beads. The sand was deposited in a random fashion on the glass plate over an area of about 1 to 5 cm², and the sand particles covered about 2% of the face of the pellicle on which they were supported.

A third simulated dust field was made as described above from glass beads and by applying thereto a polymeric film of the poly-monochlorinated-para-xylylene which was about 2.5 $\mu$m thick.

In FIG. 1, of the drawings, there is shown pellicle 1 which has dispersed thereon the particles of sand or glass 2 which may be used to form the simulated dust field.

Figure 2:
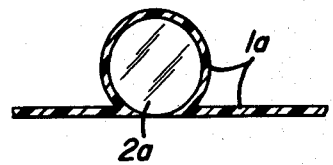

In FIG. 2 there is shown a cross section of the thin film of the pellicle 1a which supports the glass bead or sand particle 2a thereon. In this embodiment of the invention, the para-xylylene polymer is deposited on the glass beads or sand particles and the film covers and envelopes all but that portion of the glass bead or sand particle which is resting on the glass plate on which the supported glass or sand particles were first deposited as described above.

EXAMPLE II

A para-xylylene polymer pellicle was made as described in Example I except that no glass beads or sand particles were applied to the release agent beforehand. Following the formation of the pellicle, glass beads 100 to 1,000 $\mu$m in diameter were partially submerged in a polycyano acrylate adhesive and then applied directly to one face of the pellicle before the adhesive cured. The glass beads were placed on one face of the pellicle in an ordered fashion so as to cover about 2% of the supporting face of the pellicle.

Figure 3:
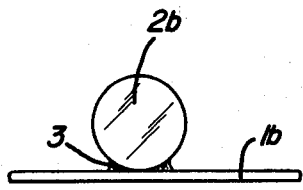

After cure of the adhesive, which took place in about 5 minutes, the beads were permanently attached to the pellicle. This is shown in FIG. 3 wherein the glass bead 2b is mounted on the thin film of polymer 1b with adhesive 3.

Instead of a poly-cyano-acrylate adhesive, a 5% solution of polystyrene in xylene; or silicon grease; or vegetable grease can also be used for the purposes of bonding the glass beads to the pellicle support.

EXAMPLE III

The mounted glass beads or sand particles prepared as in Examples I and II are used to simulate dust or ice fields which may be encountered during the flight of space vehicles or ballistic missiles. A series of up to about 150 of such simulated dust or ice fields, 6 inches to 8 inches in diameter, are mounted along the length of a 100 foot flight tunnel. A test missile is shot down the length of the tunnel so as to cause it to impinge on, and traverse through, each of the simulated fields or screens in succession. Laser and X-ray cameras take pictures of the missile after impingement to record the effect of the erosion thereon during the test flight.

EXAMPLE IV

A reactive mass center such as a bead of lithium is formed in a pellicle as in Examples I and II above. The lithium is then removed in a predictable fashion, as by the reaction with water vapor to liberate hydrogen for the purposes of monitoring the presence of extremely small amounts of residual water vapor in a test atmosphere.

EXAMPLE V

Figure 4:
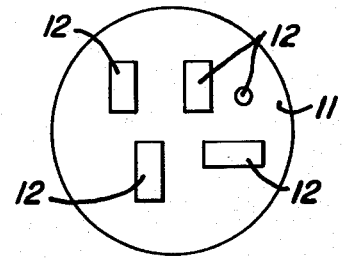
FIG. 4 shows an electron beam mask supported on a pellicle.

A release agent is applied to the surface of a glass plate as in Example I, and the thus treated surface of the plate is coated with a film of unsubstituted p-xylylene polymer about 1,000A thick. The glass slide is then placed in a vacuum evaporator with the polymer coated surface facing the evaporant source. About 30 to 50% of the surface of the polymer film is then coated with gold metal through a mask to a thickness of about 2,000A so as to form an ordered pattern of an electronic circuit on the film of p-xylylene polymer 11. The pattern is represented by the four rectangular and one circular areas 12 shown in FIG. 4. The metal coated film 11 is then removed from the glass slide as in Example I and placed in the cavity of a modified electron microscope so as to position the gold coated film between an electron beam source and a silicon wafer coated with an electron sensitive resist, which is positive or negative in activity. The electron beam having an energy of 10–100 Kev is turned on and directed towards the silicon wafer through the gold coated film of poly-p-xylene. The gold coated film acts as an electron beam mask which only allows the electrons to pass through those areas of the gold coated film which are not coated with gold with the result that the electrons reach the electron sensitive resist on the silicon wafer in a pattern which represents an image of the pattern of the gold on the mask. The resist is then processed, so as to provide the desired pattern on the silicon wafer.

EXAMPLE VI

A release agent is applied to the surface of a glass plate as in Example I, and the thus treated surface of the plate is coated with a film of unsubstituted p-xylylene polymer about 1,000A thick. The glass slide is then placed in a vacuum evaporator with the polymer coated surface facing the evaporant source. The polymer coated surface is then coated through a mask with nickel metal so as to provide a ~1000A thick pattern of a plurality of squares of nickel which are each 1 mm² in area and which are each positioned on a 2 mm² center. After being removed from the glass plate the nickel coated film is placed in proximity to a defined electromagnetic field. A beam of visible light is then made to be incident upon the metal coated film at an angle of about 90° to the plane of the film. When discrete portions of the electromagnetic field are activated those nickel metal squares which are in proximity to the activated portions of the electromagnetic field are deflected from the plane of film to which they are attached without disrupting their attachment to the film. The flexibility of the film allows for this deflection. As a result of this deflection the incident light is reflected from the deflected nickel squares at an angle different from the light incident upon those nickel squares which were not deformed or deflected out of the plane of the film. The pattern of deflected light provides an alpha numeric display which can be used for visual display purposes or computer memory purposes.

We claim:

1. An article of commerce which is a simulated rain field consisting essentially of an essentially flat film of p-xylylene polymer having a thickness of up to about 25,000 A and wholly supporting one or more discrete objects which are bonded thereto on at least one face thereof, said objects being in the form of encapsulated liquid droplets, the total surface area of said objects facing said film being less than the total surface area of the supporting face of said film, said supported objects being ohmically isolated with respect to non-supported objects; each of said objects having a particle size of up to about 5 millimeters and supported on said film so as to cover up to about 80 per cent of the surface of said field.

* * * * *